United States Patent [19]

Sirat et al.

[11] Patent Number: 4,976,504
[45] Date of Patent: Dec. 11, 1990

[54] HOLOGRAPHIC METHOD AND APPARATUS USING INCOHERENT LIGHT

[75] Inventors: Gabriel Sirat; Eric Dufresne; Didier Charlot, all of Paris; Alain Maruani, Saint Cyr L'Ecole, all of France

[73] Assignee: Etat Francais (Centre National d'Etudes des Telecommunications), Issy les Molineaux, France

[21] Appl. No.: 455,988

[22] Filed: Dec. 22, 1989

[30] Foreign Application Priority Data

Dec. 27, 1988 [FR] France .................. 88 17225

[51] Int. Cl.$^5$ ........................ G03H 1/16
[52] U.S. Cl. .................. 350/3.73; 350/3.75; 350/3.77; 350/3.81
[58] Field of Search ............ 350/3.6, 3.7, 3.71, 350/3.73, 3.75, 3.77, 3.81, 3.82, 3.83, 162.16, 452

[56] References Cited

U.S. PATENT DOCUMENTS

| | | | |
|---|---|---|---|
| 3,536,371 | 10/1970 | Post | 350/3.73 |
| 3,837,725 | 9/1974 | Bricot et al. | 350/3.73 |
| 4,036,552 | 7/1977 | Lee et al. | 350/3.73 |
| 4,095,875 | 6/1978 | Lee et al. | 350/3.73 |
| 4,602,844 | 7/1986 | Sirat et al. | 350/3.83 |

OTHER PUBLICATIONS

*Proceedings of the SPIE*, Bartholomew et al., vol. 88, 1976, pp. 97–104, "Some Useful Applications of Polarized Light in Holography and Optical Information Processing".

Deryugin et al., *Opt Spectrosc*, vol. 35, No. 2, 1973, pp. 195–199, "Polarization Contrast Method in Holography".

Kozma et al., *Applied Optics*, vol. 8, No. 2, 1969, pp. 393–397, "Bias Level Reduction of Incoherent Holograms".

Sirat et al., *Optics Letters*, vol. 10, No. 1, 1985, pp. 4–6, "Conoscopic Holography".

*Primary Examiner*—Bruce Y. Arnold
*Assistant Examiner*—J. P. Ryan
*Attorney, Agent, or Firm*—Blakely, Sokoloff, Taylor & Zafman

[57] ABSTRACT

A method of generating a quasi-complex hologram using incoherent light and a conoscope system comprising a birefringent crystal (30) inserted between two circular polarizers (10, 20), the method comprising the following steps: (i) recording a plurality of different conoscopic holograms of the same object without relative displacement thereof and with respective different polarization configurations; and (ii) combining the various conoscopic holograms obtained in this way in order to remove the bias and the conjugate image. The invention also relates to a device for implementing the method.

16 Claims, 4 Drawing Sheets

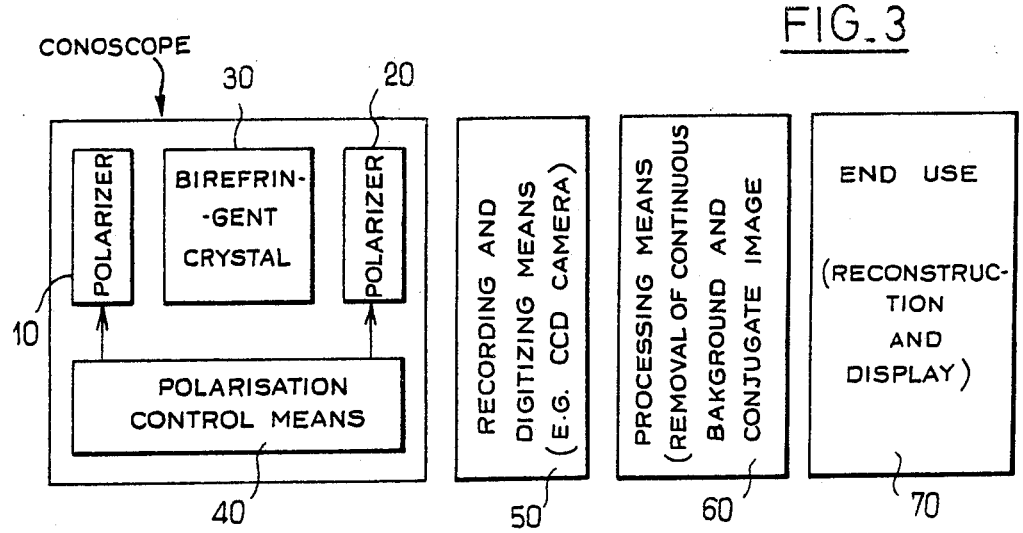
FIG_3
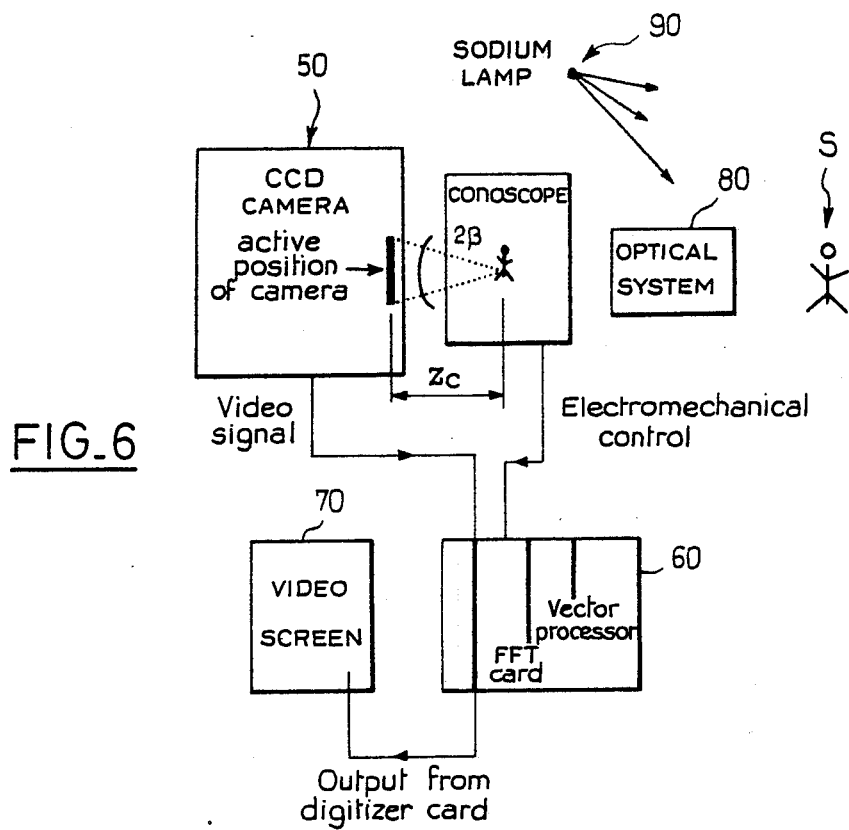
FIG_6

FIG._4
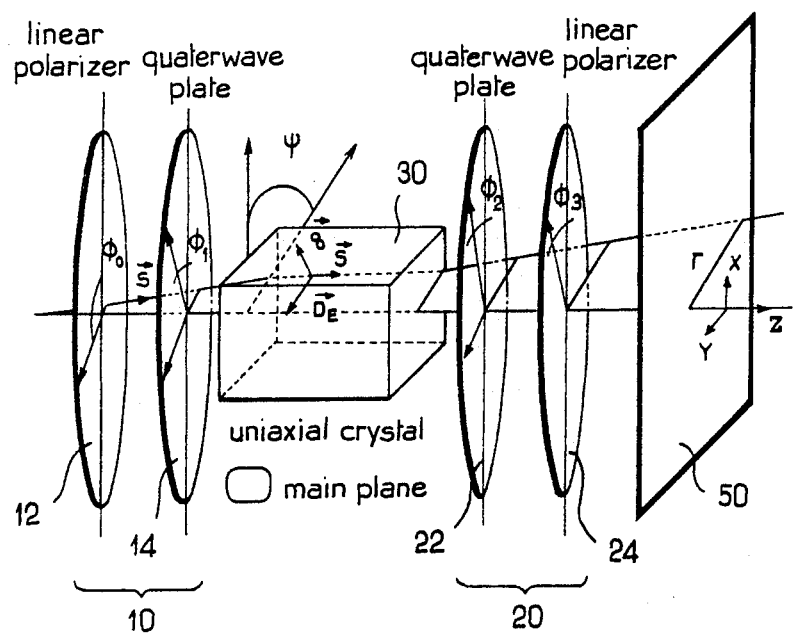
FIG._5
| $\alpha_1$ | $\alpha_2$ | T |
|---|---|---|
| $+\frac{\pi}{4}$ | $+\frac{\pi}{4}$ | $1 + \cos\alpha r^2$ |
| $-\frac{\pi}{4}$ | $-\frac{\pi}{4}$ | |
| $+\frac{\pi}{4}$ | $-\frac{\pi}{4}$ | $1 - \cos\alpha r^2$ |
| $-\frac{\pi}{4}$ | $+\frac{\pi}{4}$ | |
| 0 | $+\frac{\pi}{4}$ | $1 - \sin 2(\psi - \phi_0)\sin\alpha r^2$ |
| 0 | $-\frac{\pi}{4}$ | $1 + \sin 2(\psi - \phi_0)\sin\alpha r^2$ |

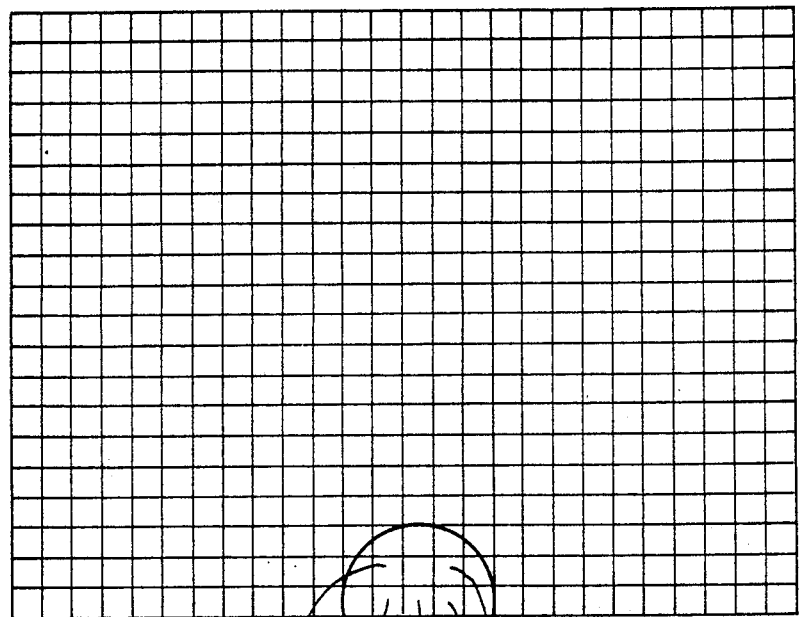
FIG_7A
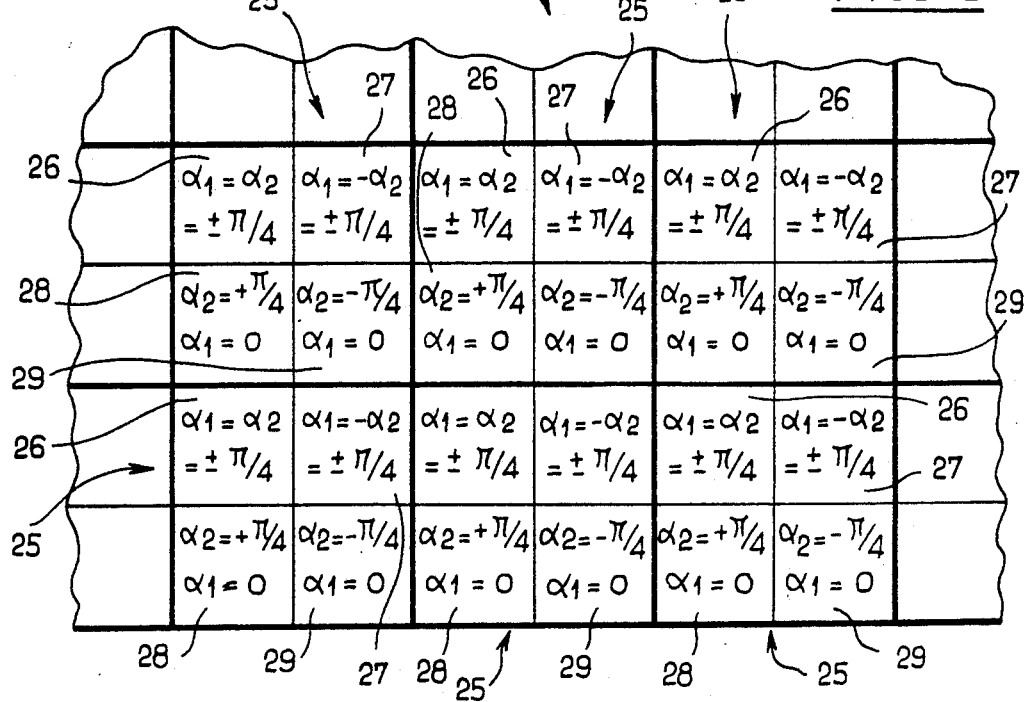
FIG_7B

HOLOGRAPHIC METHOD AND APPARATUS USING INCOHERENT LIGHT

The present invention relates to holography.

It relates more particularly to holography performed using incoherent light, commonly referred to as "conoscopic" holography by the person skilled in the art.

BACKGROUND OF THE INVENTION

A device for obtaining a conoscopic holograph using incoherent light is described in patent document U.S. Pat. No. 4,602,844.

The device described in that document includes, as illustrated diagrammatically in accompanying FIG. 1, a birefringent crystal inserted between two circular polarizers.

The crystal decomposes an incident ray firstly into an ordinary ray subjected to a refractive index $n_o$, and secondly into an extraordinary ray subjected to a refractive index which varies as a function of the angle of incidence $\theta$, with this variable refractive index being written $n_e(\theta)$.

These two rays propagate at different speeds within the crystal. As a result they are at different phases on leaving the crystal. Conographic holography is based on the fact that this phase difference is a function of the angle of incidence $\theta$. The two rays interfere after passing through the outlet polarizer such that the intensity of the resulting ray is also a function of the angle $\theta$. In other words, unlike conventional holography, each incident ray produces its own reference ray. The set of rays situated on a cone whose axis is parallel to the optical axis of the crystal and having an aperture angle $\theta$ will give the same intensity on the observation plane.

The conoscopic hologram of a point obtained by means of the above-mentioned device corresponds to a Fresnel zone as shown in accompanying FIG. 2, i.e. a series of concentric annular interference fringes.

The conoscopic hologram of an object is the superposition of the holograms of each of the points constituting the object. FIGS. 3b and 3c of above-mentioned patent document U.S. Pat. No. 4,602,844 respectively show the holograms for two points and for three points of a plane object.

The resulting hologram contains all of the useful information, such that it is possible to reconstruct the initial object in three dimensions.

The conoscopic system performs a linear transformation between the object and its hologram.

The impulse response of the system, which characterizes the linear transformation, is written:

$$T(x',y')=1+\cos(\alpha r^2) \quad (1)$$

where $r^2 = x'^2 + y'^2$, and:

$$\alpha = 2\pi L \delta n / \lambda n_o^2 Z_c^2 \quad (2)$$

with
  $\lambda$ = source wavelength
  L = crystal length
  $n_o$ = the ordinary index of the crystal
  $\delta n$ = the absolute value of the difference between the ordinary and extraordinary indices
  x,y,z = coordinates in the object volume
  x',y' = coordinates in the hologram plane $$Z_c = Z(x,y) - L + L/n_o \quad (3)$$

where $Z(x,y)$ is the distance between the holographic plane and the object point under consideration, situated at the lateral position (x,y). The Fresnel parameter $\alpha$ can also be written:

$$\alpha = \pi / \lambda_{eq}(Z_c)Z_c \quad (4)$$

thus defining an equivalent wavelength $\lambda_{eq}$:

$$\lambda_{eq} = \lambda n_o^2 Z_c / \delta n 2L \quad (5)$$

or:

$$\alpha = \pi / \lambda f_c \quad (6)$$

thus defining the focal length $f_c$ of the Fresnel lens:

$$f_c = n_o^2 Z_c^2 / \delta n 2L \quad (7)$$

When the object under consideration is plane ($\alpha$=constant) the equivalent wavelength and the focal length $f_c$ are constants of the system.

Equation (4) then shows that the conoscopic hologram of a point recorded at a wavelength $\lambda$ is similar to the hologram of the same point recorded using coherent light (Gabor holography) at the equivalent wavelength $\lambda_{eq}$. It should be observed that the conoscopic hologram measures intensities and not amplitudes.

Since the distances $Z_c$ and L are of the same order and since $\delta n$ is about 0.1, the wavelength $\lambda_{eq}$ is greater than the real wavelength $\lambda$ at which recording takes place: typically $\lambda_{eq}$=3 $\mu$m to 100 $\mu$m.

As a result, the lateral resolution in the hologram (proportional to the wavelength $\lambda$) is less in conoscopic holography than in conventional holography. Its value lies around a few tens of micrometers.

As mentioned above, the hologram recorded using a conoscopic device contains all of the useful information.

For example, for the hologram of a point corresponding to a Fresnel zone:

the center of the zone and the object point lie on the same straight line parallel to the optical axis, and if the object point is translated transversely or laterally, then the hologram is translated identically in the holographic plane; the coordinates of the center $C(x_o, y_o)$ of the Fresnel zone are thus equal to the first two coordinates of the holographed point $P(x_o, y_o, z_o)$;

the intensity of the hologram gives the light energy in the light aperture cone; and the spacing of the fringes gives the distance between the object and the observation plane, independently of the position of the conoscopic device.

The following may be written:

$$Z_c = R^2 / F\lambda_{eq} \quad (8)$$

and $$Z(x,y) = Z_c + L - L/n_o = R^2/F\lambda_{eq} + L - L/n_o \quad (9)$$

where R is the radius of the Fresnel zone, and F is the number of light and dark fringes on the radius.

In spite of the great hopes based on conscopic holography as described above, it has not yet lead to industrial developments.

This appears to be due to the fact that it is relatively difficult to make use of a hologram obtained in this way.

The inventors have observed that the conoscopic hologram also contains two types of interfering information, corresponding respectively to a coherent continuous background or "bias", and to a conjugate image, both of which degrade the basic information which is sufficient on its own for reconstructing the object.

These two types of interfering information which are superposed on the useful information when a conoscopic hologram is recorded can be shown up by illuminating the conoscopic hologram recorded on a photosensitive film by means of a monochromatic plane wave. Three diffractive beams are then observed: the first beam represents the wave transmitted directly through the film and corresponds to the bias; the second wave is a spherical wave diverging from a virtual object which is a replica of the original object; and the third wave is a spherical wave converging on a conjugate real image of the object situated symmetrically to the virtual image about the plane of the hologram.

The two above-mentioned interfering types of information (bias and conjugate image) can also be shown up by the following, more theoretical approach.

For plane objects, the linear transformation between the intensity $I(x,y)$ of the object and the intensity $H(x',y')$ of the hologram is given by the convolution:

$$H(x',y') = I(x,y) * T(x,y) \quad (10)$$

After the convolution equation (10) has been developed, the hologram appears as a Fresnel transform:

$$H(x',y') = I_o + I(x,t) * \cos(ar^2) \quad (11)$$

or $$H(x',y') = I_o + \tfrac{1}{2}I(x,t) * e^{-jar^2} \quad (11)$$

where $I_o$ represents the bias intensity which penetrates directly through the system, and $\tfrac{1}{2}I(x,y)*e^{-jar^2}$ represents the conjugate image.

The object of the present invention is to propose means for eliminating the bias and the conjugate image from the recorded hologram.

SUMMARY OF THE INVENTION

This object is achieved by the invention by means of a method of generating a quasi-complex hologram using inherent light and a conoscope system comprising a birefringant crystal inserted between two circular polarizers, the method being characterized in that it comprises the following steps:

(i) recording a plurality of different conoscopic holograms of the same object without relative displacement thereof and with respective different polarization configurations; and (ii) combining the various conoscopic holograms obtained in this way in order to remove the bias and the conjugate image.

According to another advantageous characteristic of the present invention, the circular polarizers are constituted by respective linear polarizers and respective quarterwave plates capable of relative rotation and coupled to rotary drive means, with the various polarization configurations being obtained in succession by rotating a linear polarizer and/or a quarterwave plate by using the drive means.

The present invention also provides a device for implementing the above-specified method, the device being of the type comprising a conoscopic system including a birefringent crystal inserted between two circular polarizers, and being characterized by the fact that it comprises:

means for recording a plurality of conoscopic holograms of the same object without relative displacement thereof, at different respective polarization configurations; and means suitable for combining the various different conoscopic holograms obtained in this way in order to eliminate the bias and the conjugate image.

BRIEF DESCRIPTION OF THE DRAWINGS

Embodiments of the invention are described by way of example with reference to the accompanying drawings, in which:

FIG. 3 is a block diagram of a conoscopic device suitable for implementing the present invention;

FIG. 4 is a diagram showing a preferred embodiment of the polarizing means for use in the present invention;

FIG. 5 is a table giving examples of polarization configurations obtained using the above-specified polarizer means in accordance with the present invention;

FIG. 6 is a diagram of a device in accordance with the present invention;

FIG. 7A is an overall diagrammatic view of polarizer means in accordance with another embodiment of the present invention; and FIG. 7B shows a detail view of said means.

DETAILED DESCRIPTION

Figure 1:
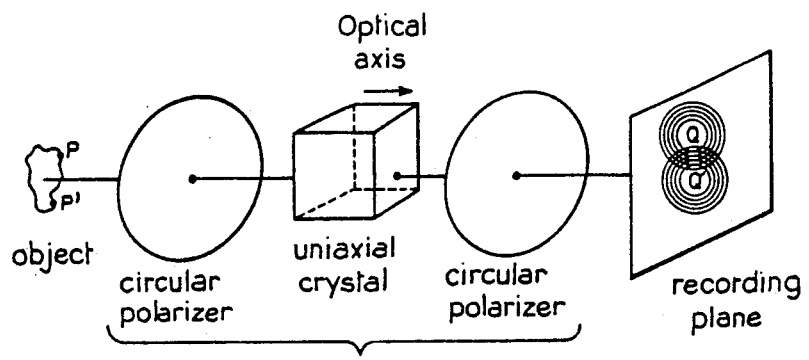
FIGS. 1 and 2 show the state of the art and are described above.
Figure 2:
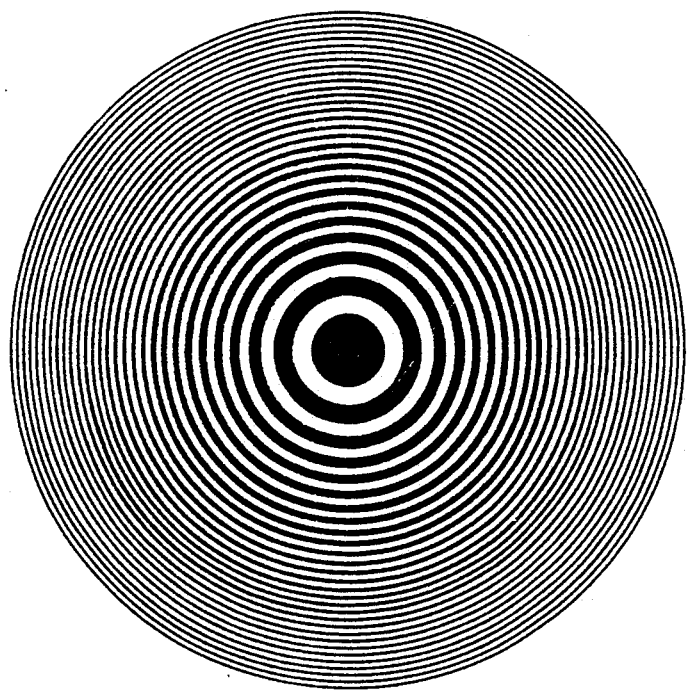

Accompanying FIG. 3 shows a holographic device in accordance with the present invention and essentially comprising: a conoscope; recording and digitizing means 50; processing means 60; and end use means 70.

The conoscope comprises a birefringent crystal 30 inserted between two polarizers 10 and 20. The conoscope also includes polarization control means 40.

The recording and digitizing means 50 are designed, in combination with the control means 40, to record and digitize different conoscopic holograms of the same object without relative displacement thereof and under different respective polarization configurations. The means 50 may be constituted by a CCD (charge coupled device) camera.

The processing means 60 are designed to remove the bias and the conjugate image from the hologram recorded and digitized by the means 50.

The end use means 70 are preferably designed to reconstitute and to display the resulting hologram, but other uses for the means 70 could be envisaged.

The conoscope system described in patent document U.S. Pat. No. 4,602,844 has inlet and outlet circular polarizers which are constituted by respective rectilinear polarizers associated with respective quarterwave plates fixed to the rectilinear polarizers.

In the presently preferred embodiment of the invention, the rectilinear polarizer and the quarterwave plate are separate.

This makes it possible to impose any polarization on the transmitted wave by rotating the quarterwave plate.

Thus, in accompanying FIG. 4, there can be seen an inlet polarizer assembly 10 comprising a linear polarizer 12 and a quarterwave plate 14; an outlet polarizer assembly 20 comprising a linear polarizer 22 and a quarterwave plate 24; a birefringent crystal 30 interposed between the two assemblies 10 and 20; and an observation plane 50 situated downstream from the outlet polarizer assembly relative to the object to be examined.

The linear polarizer 12 and the quarterwave plate 14 extend perpendicularly to an axis Z. They are not fixed to each other and are therefore capable of rotating relative to each other about the Z axis.

Similarly, the linear polarizer 22 and the quarterwave plate 24 extend perpendicularly to the Z axis. They are not fixed to each other and are therefore capable of relative rotation about the Z axis and relative to the linear polarizer 12 and the quarterwave plate 14 constituting the inlet polarizer assembly.

The above-mentioned items are rotated by motors integrated in the control means 40.

As mentioned above, the observation plane 50 is preferably constituted by an observation device such as a CCD camera.

Angles $\phi_0$, $\phi_1$, $\phi_2$, and $\phi_3$ represent the positions of the main polarization axes of the various plates 12, 14, 22, and 24 relative to an arbitrary main plane including the Z axis. In accompanying FIG. 4, this main plane is defined by the Z axis and the X axis. The incident wave $\vec{S}$ is transformed into a wave $\vec{S}'$ inside the crystal 30. The electrical vectors of the associated extraordinary and ordinary waves are $\vec{D}_e$ and $\vec{D}_o$.

The angle $\Psi$ represents the slope of the defined by the Z axis and the vector of the incident wave S relative to the main plane.

$\alpha_1$ designates the difference $\phi_0 - \phi_1$, and $\alpha_2$ designates the difference $\phi_2 - \phi_3$.

By rotating one of the quarterwave plates through $\pi/2$, a righthand circular polarizer becomes a lefthand polarizer, or vice versa.

By rotating a quarterwave plate by $\pi/4$, a circular polarizer becomes a rectilinear polarizer.

In the first case, the additional phase shift imparted between the ordinary wave and the extraordinary wave is $\pi$. The transfer function of the conoscopic system is then of the type $1 + \cos(\delta\phi + \pi)$, i.e. $1 - \cos(\delta\phi)$.

In the second case, where the incident wave on the crystal is linearly polarized, the phase shift imparted is $\pi/2$ and the transfer function is of the type $\cos(\delta\phi + \pi/2)$, i.e. $\sin(\delta\phi)$.

The qualitative arguments above show that by rotating the quarterwave plate 14 at the inlet to the system (or the quarterwave plate 24 at the outlet), it is possible to give rise to two fundamental impulse responses, namely $\cos(\delta\phi)$ and $\sin(\delta\phi)$.

The conjugate image can be removed by combining these impulse responses.

A preferred embodiment of the invention is now described in greater detail.

Four successive observations are made after appropriate rotation of the items constituting the polarizer assemblies.

For the first observation, the inlet and outlet polarizers are both circular:

$$\alpha_1 = \alpha_2 = \pm \pi/4$$

Both polarizers are righthand ($+\pi/4$) or lefthand ($-\pi/4$) circular polarizers.

The impulse response of the system is then $$T_0 = 1 + \cos(\alpha r^2) \tag{13}$$

For the second observation, the inlet and outlet polarizers are still both circular, but now they are crossed:

$$\alpha_1 = -\alpha_2 = \pm \pi/4$$

The impulse response is written:

$$T_0 = 1 - \cos(\alpha r^2) \tag{14}$$

For the third observation, the inlet polarizer is rectilinear:

$$\alpha_2 = +\pi/4, \alpha_1 = 0$$

The impulse response is written:

$$T_1(\phi) = 1 - \sin 2(\Psi - \Phi_0)\sin(\alpha r^2) \tag{15}$$

For the fourth observation the inlet polarizer is still rectilinear but $$\alpha_2 = -\pi/4, \alpha_1 = 0$$

The impulse response is written:

$$T_1(\phi) = 1 + \sin 2(\Psi - \alpha_0)\sin(\alpha r^2) \tag{16}$$

The transfer functions obtained in all four of the above cases are summarized in the table of accompanying FIG. 5.

It may be observed that providing $\phi_0$ is changed to $\phi_0 - \pi/2$ the third function can be obtained equally well with 60 $_2 = -\pi/4$ and $\alpha_1 = 0$. Thus, all four transfer functions can be obtained by adjusting the inlet plates only (or the outlet plates only).

In practice, the main polarization axes of the various plates can be rotated mechanically if the plates are crystal plates or electrically if they are electro-optical valves such as the valves sold by Displaytech Inc. under the reference LV 500A.

It is then possible, by using simple linear combinations of the transfer functions from the preceding table to obtain the following two transfer functions:

$$T_O = \cos \alpha r^2 \tag{17}$$

$$T_1(\phi_0) = \sin[2(\Psi - \phi_0)]\sin \alpha r^2 \tag{18}$$

or, by taking $\phi_0 = 0$ and $\Phi_0 = \pi/4$, respectively:

$$T_O = \cos \alpha r^2 \tag{17}$$

$$T_1(0) = \sin 2\Psi \, \sin \alpha r^2 \tag{19}$$

$$T_1(\pi/4) = \cos 2\Psi \, \sin \alpha r^2 \tag{20}$$

If the variables in the spectrum domain corresponding to $\rho$ and $\theta$, then the Fourier transforms of each of these transfer functions are written:

$$\tilde{T}_0 = (\beta/\pi)\sin\beta\rho^2 \tag{21}$$

$$\tilde{T}_1(0) = (\beta/\pi)\sin 2\theta[\cos\beta\rho^2 - (\sin\beta\rho^2)/(\beta\rho^2)] \tag{22}$$

$$\tilde{T}_1(\pi 4) = (\beta/\pi)\cos 2\theta[\cos\beta\rho^2 - (\sin\beta\rho^2)/(\beta\rho^2)] \tag{22'}$$

where $\beta = \pi^2/\alpha$.

Consequently, if the following linear combination is considered:

$$\tilde{T}_2 = \tilde{T}_0 + j \sin 2\theta \, \tilde{T}_1(0) + j \cos 2\theta \, T_1(\pi/4) \tag{23}$$

the following is obtained:

$$\bar{T}_2 = j(\beta/\pi)[\exp(-j\beta\rho^2) - (\sin\beta\rho^2)/(\beta\rho^2)] = \bar{T}_3 + \bar{T}_4 \quad (24)$$

The problem is to eliminate $\bar{T}_4$. From its analytical form, $\bar{T}_4$ is significant only around $\rho = 0$. Consequently, if this correction is to be performed for $\beta\rho^2 << 1$, it may be assumed that the parameter $\beta$ does not vary significantly over the thickness of the object (as is indeed the case if a conventional standard optical system is used which tends to compress the Z-thickness of the object), and differs little from $\beta_0$ which corresponds to the mean plane of the object. $\bar{T}_4$ can then be approximated by $(j/\pi)\beta_0$ around 0, and this value can be subtracted from the Fourier plane. For higher values of $\beta\rho^2$, a second order approximation to $\bar{T}_4$ is $j\bar{T}_0/(\beta_0\rho^2)$.

Once these treatments have been performed, the transfer function of the system may be considered as being ideal to within a very good approximation (amongst other things, the hologram will reconstruct without artifacts due to the conjugate image), with this transfer function being written:

$$T = T_3 = \exp[j\alpha r^2] \quad (25)$$

By placing the problem in cartesian coordinates, the registered conoscopic hologram is thus written:

$$H(x',y') = \int\int I(x,y) T[\alpha(x,y),(x-x'),(y-y')] dx\, dy \quad (26)$$

or else:

$$H(x',y') = \int\int I(x,y) \exp[j\alpha(x,y)[(x-x')^2 + (y-y')^2]] dx\, dy \quad (27)$$

By writing $\alpha(x,y) = \alpha_0 + \alpha_1(x,y)$, and developing the exponential around $\alpha_0$, the following is obtained:

$$H(x',y') = \sum_{i=0}^{i=n} \int\int \frac{j^i}{i!} I(x,y)\, \alpha_1(x,y)^i [(xx')^2 + (x-x')^2]^i \cdot \exp[j\alpha_0[(x-x')^2 + (y-y')^2]] dx\, dy \quad (28)$$

This can be written in the form of a series of convolutions:

$$H = \sum_{i=0}^{i=n} f_i * g_i \quad (29)$$

where:

$$f_i(x,y) = \frac{j^i}{i!} I(x,y)\, \alpha_1(x,y)^i \quad (30)$$

$$g_i(x,t) = (x^2+y^2)^i \exp[j\alpha_0(x^2+y^2)] \quad (31)$$

It can be seen that the problem of digital reconstruction is thus reduced to a problem of deconvolution.

A particular embodiment of the present invention is shown in accompanying diagrammatic FIG. 6.

The scene S is illuminated by a monochromatic sodium vapor lamp 90 and an image is formed by means of an optical system 80 having a sufficiently wide aperture to be able to obtain the desired lateral resolution. The inlet optical system 80 may be anything from a microscope to a zoom lens.

At least one of the inlet or outlet circular polarizers 10 and 20 is constituted by a rectilinear polarizer 12, 22 and a quarterwave plate 14, 24 which are not fixed to each other and which are capable of relative rotation under the control of respective associated electrical motors.

The optical polarization axes of the components 12, 14, 22, and 24 integrated in the conoscope are rotated mechanically. This mechanical solution makes it possible to benefit from using optical components of very high quality.

The crystal 30 is a calcite cylinder of length 35 mm and of diameter 20 mm. (Resolution in the hologram can be modified as a function of the geometrical characteristics of the system, i.e. the length and the birefringence of the crystal.)

The recording means 50 are constituted by a CCD camera having an array of 512×512 pixels and a resolution of 10 μm with a dynamic range of 255 gray levels (i.e. encoding on 8 bits). Holograms are thus directly input and digitized by the CCD camera.

The processing means 60 are constituted by a microcomputer fitted with signal processing cards and with an arithmetic coprocessor. The processing means 60 receive the digitized signals from the CCD camera 50. They control the motors which drive the elements 12, 14, 22, and 24 integrated in the conoscope. The means 60 thus possess in memory, after processing the signal, information relating to the necessary depth and intensity for performing, practically in real time, digital reconstructions that give an equation for a surface or for deformations.

It may be observed that in order to improve the reliability of the system, the treatment may be performed by summing over N images.

In order to give a concrete idea, currently available image digitizing cards can digitize and sum 128 images of 512 by 512 points in 4 seconds.

The signals corresponding to the digital reconstruction from the means 60 may be applied to a conventional video screen 70.

Various different ways are available for digitally reconstructing objects by means of the recorded hologram.

A distinction is made between digital reconstruction of plane objects and digital reconstruction of three dimensional objects.

For plane objects, three methods of digital reconstruction are envisaged.

The first method of digitally reconstructing plane objects corresponds to digital simulation of reconstruction using coherent light. It is mentioned in patent document U.S. Pat. No. 4,602,844, with respect to FIG. 5 thereof, that the image of an object may be obtained by using coherent light to illuminate a photographic film on which a conoscopic hologram is recorded.

A Fresnel transform can be reduced to a Fourier transform using the equation:

$$I^* e^{j\alpha r^2} = e^{j\alpha' r'^2} TF(I e^{j\alpha r^2}) \quad (32)$$

where TF designates the Fourier transform operator.

After multiplying the hologram by an appropriate phase term, the object can thus be reconstructed merely by a Fourier transform. Digitally, this operation is achieved simply by using fast Fourier transform algorithms. In order to obtain satisfactory agreement between the digitally calculated Fourier transform and the Fourier transform obtained analytically, it suffices to choose an appropriate sampling pitch in the hologram.

The second method of digitally reconstructing plane objects corresponds in digital simulation of the conoscope optical construction.

With reference to FIG. 4 of patent document U.S. Pat. No. 4,602,844, it is shown that the image can be obtained by placing the conoscope hologram at the inlet to the recording system. Numerically, this is obtained by convolution of the hologram with the Fresnel function $\cos(\alpha r^2)$.

The third method of digitally reconstructing plane objects corresponds to Wiener filtering. This method is implemented by treating the Fourier transform of the hologram by an appropriate filter in the Fourier domain.

For digital reconstruction of three dimensional objects, the linear transformation is no longer a convolution, but is written:

$$H(x',y') = \int\int I(x,y) \exp[j\alpha(x,y)[(x - x')^2 + (y - y')^2]] dx \, dy \quad (27)$$

where the integration is performed over the surface $\Sigma$ of the object.

For an object of small longitudinal extent, i.e.:

$$(\delta Z_c/Z_c) \leq 1/\pi f \quad (33)$$

where F is the number of fringes in the Fresnel zone. Equation (27) can be reduced to a convolution series, i.e.:

$$H = \sum_{n=0}^{n=\infty} \alpha_n I_n * T_n \quad (34)$$

in the Fourier domain:

$$H = \sum_{n=0}^{n=\infty} \alpha_n I_n * T_n \quad (35)$$

It is then possible to determine the real functions $\alpha(x,y)$ and $I(x,y)$ to a first approximation by retaining only the first two terms in the series development. At the following order, the first approximations for I and $\alpha 0$ are used to calculate the following terms in the development. These terms are then subtracted from the initial hologram and the equation is solved a second time to the second order.

Naturally the present invention is not limited to the preferred embodiment described above, but extends to any variant coming within the scope of the claims.

In a first variant, the elements 12, 14, and 22, 24 constituting the inlet polarizer 10 and the outlet polarizer 20 are fixed and are not capable of relative rotation, and the various polarizations required for obtaining a plurality of holograms corresponding to different transfer functions, such as those summarized in the table of FIG. 5, are obtained by inserting appropriate polarizers upstream and/or downstream of the birefringent crystal 30.

In a second variant, the system of the present invention does not record four conoscopic holograms in succession corresponding to four different respective polarizations, but records the four holograms corresponding to the appropriate different polarizations simultaneously. To do this, one of the polarizers, preferably the outlet polarizer 20 adjacent to the recording means 50, is constituted by a lattice of P lines by Q columns of matrices 25, i.e. PQ matrices each constituted by four subelements 26, 27, 28, and 29 corresponding respectively to the required polarizations. Preferably, each of the PQ matrices 25 is made in the form of a matrix having 2 lines by 2 columns of subelements, as shown diagrammatically in accompanying FIG. 7. The area of each of the subelements 26, 27, 28, and 29 corresponds to one pixel in the recording means 50.

There are numerous applications for the present invention, and the following may be mentioned by way of non-limiting example: automatic inspection of parts; object recognition and robotics; holograph interferometry; and three dimensional imaging.

It may also be observed that recording conoscopic holograms, processing them to eliminate the bias and the conjugate image, and reconstruction for end use may be performed as various different steps that are separated in time.

We claim:

1. A method of generating a quasi-complex hologram using incoherent light and a conoscope system comprising a birefrigerant crystal inserted between two circular polarizers, the method comprising the following steps:
    (i) recording a plurality of different conoscopic holograms of the same object without relative displacement thereof and with respective different polarization configurations;
    (ii) digitizing said plurality of different conoscopic holograms to form a plurality of digital signals, each corresponding to one of said different conoscopic holograms, and
    (iii) combining by calculation in an arithmetic processor the various digital signals corresponding to the different conoscopic holograms obtained in this way in order to remove the bias and the conjugate image.

2. A method of generating a quasi-complex hologram according to claim 1, wherein step (i) consists in recording four conoscopic holograms of the same object without relative displacement thereof and at respective different polarization configurations.

3. A method according to claim 1, wherein step (i) consists in recording four conoscopic holograms in the following respective polarization configurations with circular polarizers consitituted by respective linear polarizers and respective quaterwave plates capable of relative rotation;

$$\alpha_a = \alpha_b = +/-\pi/4 \quad (1)$$

$$\alpha_a = -\alpha_b = +/-\pi/4 \quad (2)$$

$$\alpha_a 0 \text{ and } \alpha_b = +\pi/4 \quad (3)$$

$$\alpha_a 0 \text{ and } \alpha_b = -\pi/4 \quad (4)$$

where $\alpha_a$ represents the angular difference between the prinicple polarization axes ($\phi_0$, $\phi_1$) of the linear polarizer and the associated quaterwave plate of one of the circular polarizers; and $\alpha_b$ represents the angular difference between the principle polarization axes ($\phi_2$, $\phi_3$) of the linear polarizer and the associated quaterwave plate of the other circular polarizer.

4. A method according to claim 3, wherein said four conoscopic holograms have the following transfer functions respectively:

$$Ta = 1 + \cos \alpha r^2 \quad (1)$$

$$Tb = 1 - \cos \alpha r^2 \quad (2)$$

$$Tc = 1 - \sin 2(\Psi - \phi 0) \sin \alpha r^2 \quad (3)$$

$$Td = 1 + \sin 2(\Psi - \phi 0) \sin \alpha r^2 \quad (4)$$

and step (iii) consists in:
(a) linearly subtracting firstly the digital signal corresponding to Tb from the digital signal corresponding to Ta, and secondly the digital signal corresponding to Tc from the digital signal corresponding to Td to form the following transfer functions:

$$T0 = \cos \alpha r^2$$

$$T1(\phi 0) = \sin(2(\Psi - \theta_0)) \sin \alpha r^2$$

which, putting $\Phi 0 = 0$ and $\phi 0 = \pi/4$ reduce respectively to:

$$T1(0) = \sin(2/\Psi) \sin \alpha r^2$$

$$T1(\pi/4) = \cos 2 \Psi . \sin \alpha r^2$$

(b) determining the Fourrier transform $\widetilde{T}0$ and $\widetilde{T}1$ of the above-mentioned transfer functions T0 and T1;
(c) performing the following linear combination $$T2 = T0 + j \sin 2 \theta \widetilde{T}1(0) + j \cos 2\theta \widetilde{T}1 (\pi/4); \text{ and}$$

(d) subtracting $j\beta \, 0/\pi$ from $\widetilde{T}2$ if $\beta\rho^2 << 1$, or subtracting $j\widetilde{T}0/(\beta 0\rho^2)$ from T2 for higher values of $\beta\rho^2$, in order to obtain the complex hologram, where:

$\Psi$ represents the slope relative to a reference plane including the optical axis of the system of a plane defined by the same optical axis and by the incident wave vector $\overline{S}$;

$$r^2 = x'^2 + y'^2$$

where x', y' represents coordinates in the plane of the hologram;

0 and $\rho$ represents variables corresponding to $\widetilde{T}$ and r in the spectrum domain;

$$\beta = \pi^2/\alpha; \text{ and}$$

$\beta 0$ corresponds to the mean plane of the object.

5. A method according to claim 1, wherein the various configurations are obtained successively by interposing appropriate polarizers upstream or downstream from the birefrigerant crystal.

6. A method according to claim 1, wherein the various polarization configurations are obtained simultaneously by means of a polarizer constituted by a lattice of P lines by Q columns of matrices, i.e. PQ matrices, each constituted by four subelements corresponding to respective ones of the required polarizations.

7. A method according to claim 1, including a further step (iv) of digital reconstruction of the hologram after removal of its bias and its conjugate image, with reconstruction being performed by multiplying the hologram by a phase turn.

8. A method according to claim 1, including a further step (iv) of digital reconstruction by convolution of the hologram with its bias and conjugate image removed, the convolution being with the Fresnel function cos-($\alpha r^2$).

9. A method according to claim 1, including a further step (iv) of digital reconstruction by subjecting the hologram with its bias and conjugate image removed therefrom to Wiener filtering.

10. A method according to claim 1, wherein for three dimensional objects, it includes a further step (iv) of digital reconstruction consisting in:
(a) determining real functions o(x,y) and I(x,y) to a first approximation by calculating the hologram in the form of a convolution series $$H = \sum_{n=0}^{n=\infty} a_n I_n * T_n$$

and in retaining only the first two terms in the series development;
(b) calculating the following terms in the development on the basis of the first approximations; then
(c) subtracting the terms obtained from the initial hologram and solving the second order equation again.

11. Apparatus for generating a quasi-complex hologram using incoherent light, the apparatus being of the type comprising a conoscopic system including a birefrigerant crystal inserted between two circular polarizers, the apparatus comprising:
means for recording a plurality of conoscopic holograms of the same object without relative displacement thereof, at different respective polarization configurations;
means for digitizing said plurality of different conoscopic holograms to form a plurality of digital signals each corresponding to one of said different conoscopic holograms; and
an arithmetic processor for combining the various digital signals corresponding to the different conoscopic holograms obtained in this way in order to eliminate the bias and the conjugate image.

12. Apparatus according to claim 11, including at least one circular polarizer constituted by a linear polarizer and a quarterwave plate capable of relative rotation, together with rotary drive means for the linear polarizer and/or the quarterwave plate in order to change the polarization configuration.

13. Apparatus according to claim 11, including means for selectively interposing polarizers upstream or downstream from the birefringent crystal in order to change the polarization configuration.

14. Apparatus according to claim 11, including a polarizer constituted by a lattice of P lines by Q columns of matrices, i.e. PQ matrices, each constituted by four subelements corresponding to respective ones of the required polarizations.

15. Apparatus according to claim 11, wherein the recording means comprise a camera such as a CCD camera coupled to a digital memory.

16. A method of generating a quasi-complex hologram using incoherent light and a conoscopic system comprising a birefrigerant crystal inserted between two circular polarizers, the method comprising the following steps:
(i) recording four conoscopic holograms of the same object without relative displacement thereof in the following respective different polarization configurations with circular polarizers constituted by respective linear polarizers and respective quaterwave plates capable of relative rotation:

$$\alpha_a = \alpha_b = +/- \pi/4 \quad (1)$$

$$\alpha_a = -\alpha_b = +/- \pi/4 \quad (2)$$

$$\alpha_a = 0 \text{ and } \alpha_b = +\pi/4 \quad (3)$$

$$\alpha_a = 0 \text{ and } \alpha_b = -\pi 4 \quad (4)$$

where $\alpha_a$ represents the angular difference between the principle polarization axes ($\phi 0$, $\phi 1$) of the linear polarizer and the associated quaterwave plate of one of the circular polarizers; and $\alpha_b$ represents the angular difference between the principle polarization axes ($\phi 2$, $\phi 3$) of the linear polarizer and the associated quaterwave plate of the other circular polarizer, so that said four recorded conoscopic holograms have the following transfer functions respectively;

$$Ta = 1 + \cos \alpha r^2 \quad (1)$$

$$Tb = 1 - \cos \alpha r^2 \quad (2)$$

$$Tc = 1 - \sin 2(\Psi - \phi 0) \sin hu \, \alpha r^2 \quad (3)$$

$$Td = 1 + \sin 2(\Psi - \phi 0) \sin \alpha r^2 \quad (4)$$

(ii) digitizing said four conoscopic holograms to form four digital signals each corresponding to one of said four conoscopic holograms, and (iii) combining the four digital signals by (a) linearly subtracting firstly the digital signal corresponding to Tb from the digital signal corresponding to Ta, and secondly the digital signal corresponding to Tc from the digital signal corresponding to Td to form the following transfer functions:

$$T0 = \cos \alpha r^2$$

$$T1(\phi 0) = \sin 2(\Psi - \phi 0) \sin \alpha r^2$$

which, putting $\phi 0 = 0$ and $\phi 0 = \pi/4$ reduce respectively to:

$$T1(0) = \sin[2/\Psi] \sin \alpha r^2$$

$$T1(\pi/4) = \cos 2 \Psi \sin \alpha r^2$$

(b) determining the Fourier transform $\widetilde{T}0$ and $\widetilde{T}1$ of the above-mentioned transfer functions T0 and T1;

(c) performing the following linear combination $$T2 = T0 \; 30 \; j \sin 2\theta \widetilde{T}1(0) + j \cos 2 \; \theta \widetilde{T}1(\pi/4); \text{ and}$$

(d) subtracting $j\beta 0/\pi$ from $\widetilde{T}2$ if $\beta\rho^2 \, 1$, or subtracting $j \, \widetilde{T} \, 0/(\beta 0 \rho^2)$ from $\widetilde{T}2$ for higher values of $\beta\rho^2$, in order to obtain the complex hologram, where:

$\Psi$ represents the slope relative to a reference plane including the optical axis of the system of a plane defined by the same optical axis and by the incident wave vector $\widetilde{S}$;

$$r^2 = x'^2 + y'^2$$

where $x'$, $y'$ represents coordinates in the plane of the hologram;

$\theta$ and $\rho$ represents variable corresponding to $\widetilde{T}$ and r in the spectrum domain;

$\beta = \pi^2/\alpha$; and $\beta 0$ corresponds to the mean plane of the object.

* * * * *

UNITED STATES PATENT AND TRADEMARK OFFICE
CERTIFICATE OF CORRECTION

PATENT NO. : 4,976,504          Page 1 of 3
DATED : 12/11/90
INVENTOR(S) : Sirat et al.

It is certified that error appears in the above-indentified patent and that said Letters Patent is hereby corrected as shown below:

| | | |
|---|---|---|
| col. 02, line 08 | delete "$\alpha = \pi /\ _{eq}(Z_c)Z_c$" | insert -- $\alpha = \pi /\lambda_{eq}(Z_c)Z_c$ -- |
| col. 02, line 60 | delete "$R^2/F\lambda$ eq" | insert -- $R^2/F\lambda_{eq}$ -- |
| col. 02, line 64 | delete "conscopic" | insert --conoscopic-- |
| col. 02, line 65 | delete "lead" | insert --led-- |
| col. 03, line 30 | delete "$= I_0 + I(x,t) * T(x,y)$" | insert -- $= I_0 + I(x,y) * T(x,y)$ -- |
| col. 03, line 34 | delete "(11)" | insert --(12)-- |
| col. 03, line 34 | delete "$= I_0 + 1/2\ I(x,t) * e^{-j\alpha r2}$" | insert -- $= I_0 + \frac{1}{2}I(x,y) * e^{j\alpha r^2} + \frac{1}{2}I(x,y) * e^{-j\alpha r^2}$ -- |
| col. 03, line 46 | delete "inherent" | insert --incoherent-- |
| col. 05, line 26 | before "defined" | insert --plane-- |
| col. 05, line 27 | delete "S" | insert --$\vec{S}$-- |
| col. 06, line 23 | delete "$\sin 2(\Psi-\alpha_0)$" | insert --$\sin 2(\Psi-\phi_0)$-- |
| col. 06, line 30 | delete "$60_2$" | insert --$\alpha_2$-- |
| col. 06, line 60 | delete "$T_1(\pi_4)$" | insert --$\tilde{T}_1(\pi/4)$-- |
| col. 06, line 66 | delete "$T_1(\pi/4)$" | insert --$\tilde{T}_1(\pi/4)$-- |
| col. 09, line 29 | delete "$\leq 1/\pi f$" | insert --$\leq 1/\pi F$-- |
| col. 09, line 41 | delete "$H = \sum_{n=0}^{n=\infty}\alpha_n I_n * T_n$" | insert -- $\tilde{H} = \sum_{n=0}^{n=\infty}\alpha_n \tilde{I}_n * \tilde{T}_n$ -- |
| col. 09, line 47 | delete "$\alpha 0$" | insert --$\alpha$-- |
| col. 10, line 24 | delete "birefrigerant" | insert --birefringent-- |
| col. 10, line 47 | delete "consitituted" | insert --constituted-- |

UNITED STATES PATENT AND TRADEMARK OFFICE
CERTIFICATE OF CORRECTION

PATENT NO. : 4,976,504

DATED : 12/11/90

INVENTOR(S) : Sirat et al.

Page 2 of 3

It is certified that error appears in the above-indentified patent and that said Letters Patent is hereby corrected as shown below:

| | | |
|---|---|---|
| col. 10, line 48 | delete "quaterwave" | insert --quarterwave-- |
| col. 10, line 62 | delete "prinicple" | insert --principle-- |
| col. 10, line 64 | delete "quaterwave" | insert --quarterwave-- |
| col. 10, line 67 | delete "quaterwave" | insert --quarterwave-- |
| col. 11, line 29 | delete "Fourrier" | insert --Fourier-- |
| col. 11, line 41 | delete "$\tilde{S}$" | insert --$\vec{S}$-- |
| col. 11, line 46 | delete "$\tilde{T}$" | insert --$\vec{T}$-- |
| col. 11, line 55 | delete "birefrigerant" | insert --birefringent-- |
| col. 12, line 10 | delete "o (x,y)" | insert --$\alpha$ (x,y)-- |
| col. 12, line 26 | delete "birefrigerant" | insert --birefringent-- |
| col. 12, line 61 | delete "birefrigerant" | insert --birefringent-- |
| col. 13, line 15 | delete "quaterwave" | insert --quarterwave-- |
| col. 13, line 19 | delete "quaterwave" | insert --quarterwave-- |

UNITED STATES PATENT AND TRADEMARK OFFICE
CERTIFICATE OF CORRECTION

PATENT NO. : 4,976,504
DATED : 12/11/90
INVENTOR(S) : Sirat et al.

It is certified that error appears in the above-indentified patent and that said Letters Patent is hereby corrected as shown below:

col. 13, line 28   delete "hu"
col. 14, line 16   delete "Fourrier"   insert --Fourier--
col. 14, line 29   delete "$\tilde{S}$"   insert --$\vec{S}$--

Signed and Sealed this

Fifteenth Day of February, 1994

BRUCE LEHMAN

*Commissioner of Patents and Trademarks*

UNITED STATES PATENT AND TRADEMARK OFFICE
CERTIFICATE OF CORRECTION

PATENT NO. : 4,976,504
DATED : December 11, 1990
INVENTOR(S) : Sirat et al

It is certified that error appears in the above-indentified patent and that said Letters Patent is hereby corrected as shown below:

On the title page: Item [73] Assignee after "Etat Francais" insert --représenté par le Ministre des Postes Télécommunications et de l'Espace --

Signed and Sealed this

Eighteenth Day of October, 1994

Attest:

BRUCE LEHMAN

*Attesting Officer*      *Commissioner of Patents and Trademarks*